United States Patent [19]

Watanabe et al.

[11] Patent Number: 4,686,593

[45] Date of Patent: Aug. 11, 1987

[54] OVERRIDING LOADING DOOR FOR A MAGNETIC RECORDING/REPRODUCING APPARATUS

[75] Inventors: Yoshiyuki Watanabe; Yukio Shibata, both of Kanagawa, Japan

[73] Assignee: Fuji Photo Film Co., Ltd., Kanagawa, Japan

[21] Appl. No.: 707,495

[22] Filed: Feb. 28, 1985

[30] Foreign Application Priority Data

Feb. 28, 1984 [JP] Japan .................................. 59-36953
Feb. 28, 1984 [JP] Japan .................................. 59-36954

[51] Int. Cl.⁴ ............................................ G11B 17/04
[52] U.S. Cl. ...................................... 360/97; 360/96.6
[58] Field of Search .................................. 360/97–99, 360/96.6

[56] References Cited

U.S. PATENT DOCUMENTS 4,301,484 11/1981 Sawaguchi et al. ................ 360/96.6
4,509,085 4/1985 Saito .................................... 360/96.6

FOREIGN PATENT DOCUMENTS

3415412 12/1984 Fed. Rep. of Germany ........ 360/97
58-14359 1/1983 Japan .................................. 360/96.6
58-212656 12/1983 Japan .................................. 360/97
59-33666 2/1984 Japan .................................. 360/99
59-96563 6/1984 Japan .................................. 360/97
59-218681 12/1984 Japan .................................. 360/97

Primary Examiner—John H. Wolff
Assistant Examiner—Matthew J. Bussan
Attorney, Agent, or Firm—Young & Thompson

[57] ABSTRACT

A magnetic recording/reproducing apparatus having an opening and closing door for loading and unloading a magnetic sheet pack, the door being adapted to override a position wherein the door is locked and then to return thereto, upon loading the magnetic sheet pack. The door has a pressure member which, during the overriding movement of the door, presses a center core of the magnetic sheet to forcibly mount the magnetic sheet onto a spindle. The pressure member is spaced from the center core when the door retreats to its locked position, in which the door cannot move in any direction. A switching member is provided so as to control a driving motor for the spindle in cooperation with the action of a mechanical device for locking the door.

6 Claims, 18 Drawing Figures

OVERRIDING LOADING DOOR FOR A MAGNETIC RECORDING/REPRODUCING APPARATUS

FIELD OF THE INVENTION

This invention relates to a magnetic recording/reproducing apparatus, and more particularly relates to a magnetic recording/reproducing apparatus in which a loading door is capable of being opened and closed for loading and unloading a magnetic sheet pack therein, the sheet pack having a magnetic sheet therein which is to be detachably drivingly connected to a driving spindle of the apparatus.

DESCRIPTION OF THE PRIOR ART

Generally, still picture cameras using silver halide photosensitive materials have been used to record still pictures. Recently, electronic still picture cameras have been developed that are capable of electrically recording images, and these have attracted special interest. Such electronic still picture cameras comprise an image pickup device and a magnetic recording apparatus for modulating and then recording video signals from the image pickup device on a magnetic sheet. Magnetic recording apparatus of the type mentioned above, to be incorporated in an electronic still picture camera, is disclosed, for example, in Unexamined Japanese Utility Model Publ. No. 57-201696. Briefly, in this apparatus, a pack holder which is provided inside a loading door to receive a magnetic sheet pack therein is forced to be positioned in place in the body portion of the apparatus in cooperation with closing movement of the loading door, thereby locating the magnetic sheet in its loaded position. The magnetic recording sheet in the loaded position is fixed to a motor-driven spindle and, simultaneously, comes into contact with a magnetic recording head. When taking or recording a picture, video information for one field is recorded on a track having a width of 0.06 mm on the face of the magnetic sheet which is being driven at 3,600 rpm. It is known to use two tracks for one frame in order to reproduce 60 fields or 30 frames of images per second.

In the above-mentioned magnetic recording/reproducing apparatus, there has arisen the serious problem attributable to the extremely narrow width of tracks, that even a slight play between the center core of the magnetic sheet and the spindle with the magnetic sheet fixed thereto, will disable the magnetic sheet pack from being usable with recording and reproducing apparatus or with separate reproducing apparatus, and that repeatability of the position of the magnetic sheet on the spindle is scarcely possible, resulting in great difficulty in reproducing exact images.

In order to overcome the problems mentioned above, it has been proposed that a conventional magnetic sheet be provided with a center core which is made of an elastically deformable material, such as plastic, in which is formed a center opening having a diameter slightly smaller than that of the spindle so that there is almost no play therebetween.

However, it is quite hard for the above-mentioned magnetic sheet to be mounted on the spindle, that is to say, there will be a substantial chance, for example, that the center core will be caught by the spindle, resulting in unsuccessful loading of a magnetic sheet into either the recording or the reproducing apparatus. In order to overcome such unsuccessful loading, it is necessary to force the center core against the spindle. For this purpose, there has been proposed a loading door which is adapted to be normally opened by the force of a biased spring and to be capable of overriding movement beyond a position in which it is to be locked when pushed against the biasing spring. The loading door is provided with a flat spring attached to the inside thereof which forces the center core of the magnetic sheet to be mounted on the spindle upon overriding movement of the loading door. After the completion of mounting of the magnetic sheet, the loading door is returned to the locked position with the flat spring spaced from the center core, thereby permitting the magnetic sheet to rotate at a high, regular speed without being obstructed by the flat spring.

A problem to be solved is to provide a mechanical device for locking the loading door which fulfills the requirement of overriding beyond the locked position in order securely to mount the magnetic sheet on the spindle, which mechanical device must prevent accidental opening of the loading door. Specifically, if the loading door is pushed inadvertently during either recording or reproducing, the loading door will move close to the body of the apparatus so as to bring the flat spring into contact with the center core of the magnetic sheet. This arrests the smooth rotation of the magnetic sheet. Consequently, either recording or reproducing is impaired.

Furthermore, recording/reproducing apparatus has heretofore been provided with a manually operable power switch for causing a drive motor to rotate. If either the opening or the closing operation of the loading door is performed when the switch is on, the magnetic sheet will be pressed against or disconnected from the spindle while rotating at a high speed. Such an operation of the loading door produces undesirable results. For example, when the magnetic sheet is rotated at the very beginning of the mounting operation, the magnetic sheet is insufficiently seated on the spindle by the overriding movement of the loading door, and there arises a load fluctuation between the magnetic sheet and the magnetic head or control plate which will be described hereinafter. The results of such a load fluctuation are faulty recording or reproducing, scratch marks on the surface of the magnetic sheet, and damage to the magnetic head which is usually extremely thin. If, when opening the loading door for unloading the magnetic sheet from the apparatus, the magnetic sheet is forcibly removed from the spindle while rotating at a high speed, damage will result.

In order to control the above-mentioned load fluctuation or to maintain the contact pressure stable, it is well known to provide a control plate which is disposed opposite to the magnetic head to approach closely the back surface of the magnetic sheet. The control plate has an end portion with a concavity formed therein which contributes to stable air flow during high speed rotation of the magnetic sheet. The stable pressure of the air flow thus produced serves as a bearing pressure for the magnetic sheet. Consequently, the part of the magnetic sheet borne by such stable pressure ensures the exposure thereof to the magnetic head at a stable pressure.

The control plate provided for the purpose described above should be not only kept away from its working position so as to permit the magnetic sheet to be either loaded or unloaded but also located in its correct or working position wherein a predetermined distance from the magnetic sheet is maintained. Accordingly, the control plate is, in order to perform its functions, provided with a mechanism for moving and positioning the control plate. To do this, there is provided a spring for elastically supporting the control plate inside the loading door so as to make the control plate follow the opening and closing movements of the loading door for loading and unloading the magnetic sheet. The control plate has a hole formed therein which is adapted to receive a positioning pin mounted on the apparatus. In such a way, the correct positioning of the control plate not only vertically but also in the desired plane is ensured.

In the prior art, since the loading door which elastically supports the control plate is pivotally hinged on the body of the apparatus to open and close, the control plate moves in a plane parallel to the loading door and approaches the surface of the magnetic sheet upon pivotal movement of the loading door, that is, the control plate is obliged to approach on a slant the spatial plane in which the control plate is finally positioned. This slanting approach makes it very difficult for the positioning pin smoothly to enter the hole with an accurate fit. It might be thought that the control plate could be forcibly pushed so as to force the positioning pin to enter the hole. But the application of strong force causes the control plate to deform, resulting in an incorrect positioning thereof relative to the surface of the magnetic sheet. It might also be thought useful to provide some play between the pin and the hole. However, the presence of play makes it very hard to position the control plate with a high accuracy. Considering these difficulties, and remembering that the positioning pin enters and leaves the hole of the control plate with every opening and closing operation of the loading door, one side surface of either the positioning pin or the hole, or both, is liable to wear out.

OBJECTS OF THE INVENTION

A principal object of the present invention is, therefore, to provide a magnetic recording/reproducing apparatus provided with a loading door which is capable of overriding movement beyond a locking position for loading a magnetic sheet and which, once locked, is prevented from overriding.

Another object of the present invention is the provision of a magnetic recording/reproducing apparatus in which a driving motor is actuated to rotate a magnetic sheet when the loading door is returned to a locking position after movement thereof beyond the locking position.

A further object of the present invention is to provide a magnetic recording/reproducing apparatus which has a control plate capable of being positioned with a high accuracy so as to provide a stable contact pressure between a magnetic sheet and a magnetic head.

A still further object of the present invention is to provide a magnetic recording/reproducing apparatus in which the loading of a magnetic sheet takes place reliably and precisely.

BRIEF DESCRIPTION OF THE INVENTION

To accomplish the above objects, the present invention contemplates that the loading door, which is opened and closed for loading and unloading a magnetic sheet pack from a magnetic recording/reproducing apparatus, be capable of moving beyond the position in which the loading door is to be locked, so that the magnetic sheet is forcibly mounted on or fixed to a driving spindle. Thereafter, the loading door is locked in the locking position and does not move further in any direction, that is, neither in the opening nor in the closing direction.

According to a preferred feature of the magnetic recording/reproducing apparatus of the present invention, there is provided a switching element which is actuated by a mechanical device for locking the loading door in its correct locking position to control a driving motor for rotating the magnetic sheet.

According to another preferred feature of the magnetic recording/reproducing apparatus of the present invention, there is provided a control plate which is elastically supported inside the loading door so as to control the magnetic sheet and which is adapted to move parallel to the door during overriding movement of the loading door.

The present invention is applicable to a magnetic reproducing apparatus incorporated in a printing apparatus for making a permanent copy and a viewer for displaying a reproduced image, and to an apparatus having both recording and reproducing functions, as well as to magnetic recording apparatus incorporated in electronic still cameras. In this specification, any such device is referred to as a magnetic recording/reproducing apparatus.

BRIEF DESCRIPTION OF THE DRAWINGS

The nature of this invention, as well as other objects and advantages thereof, will be readily apparent from a consideration of the following description relating to the accompanying drawings, in which like reference characters designate the same or similar parts throughout the figures thereof, and wherein.

DETAILED DESCRIPTION OF THE INVENTION

Figure 1:
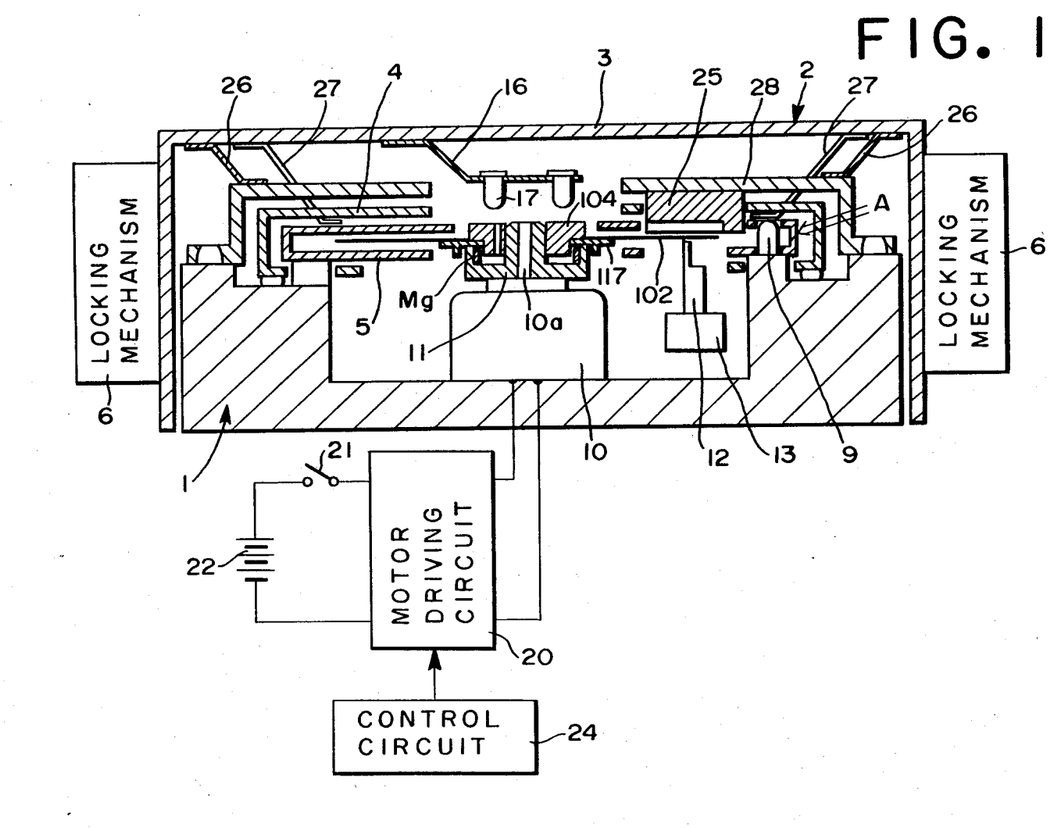
FIG. 1 is a schematic cross sectional view of an embodiment in which the present ivention is applied to a magnetic recording/reproducing apparatus.

Referring now to FIG. 1, there is shown in a schematic cross sectional view a preferred embodiment of a magnetic recording/reproducing apparatus comprising a body 1 and a pack loading part 2 which is so mounted on the body 1 as to open and close freely and which comprises a loading door 3 and a pack holder 4 resiliently supported inside the loading door 3 by means of a flat spring (not shown). The pack holder 4 is adapted to receive a pack 5 enclosing a magnetic sheet therein. Provided on both sides of the body 1 and the door 3 are locking mechanisms 6 described hereinafter which are capable of correctly positioning and locking the loading door 3 in place.

Figure 2A:
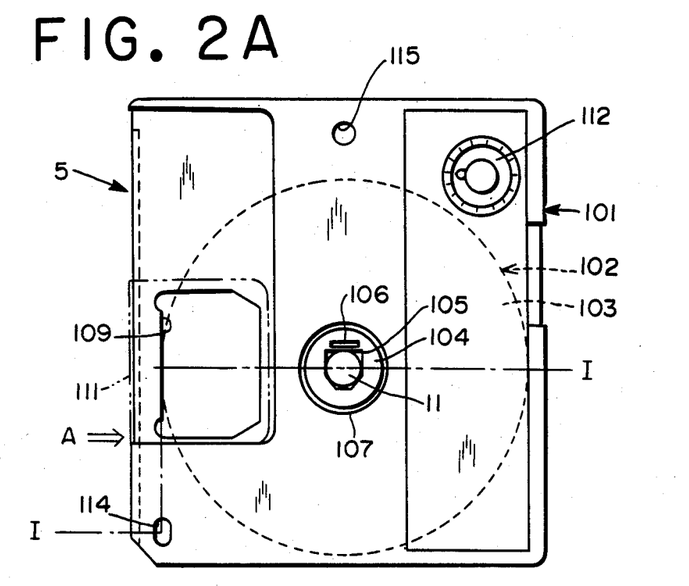
FIG. 2A is a plan view of a magnetic sheet pack.
Figure 2B:
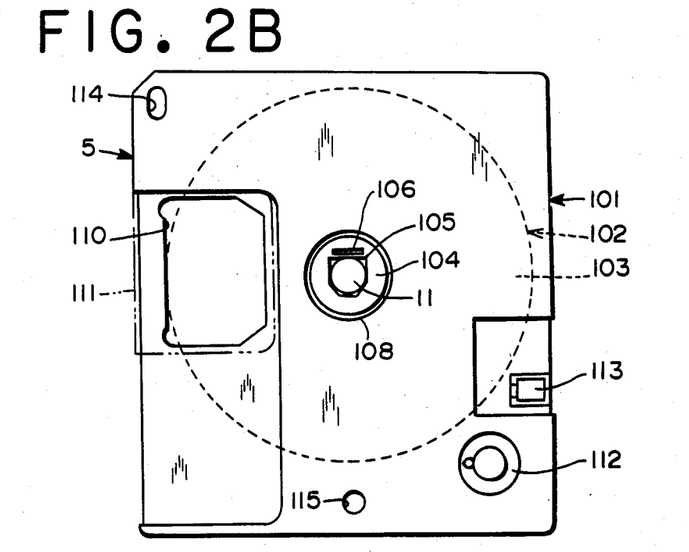
FIG. 2B is a rear view of the magnetic sheet pack of FIG. 2A.

Referring now to FIGS. 2A and 2B, there is shown an example of a magnetic sheet pack for use with the magnetic recording/reproducing apparatus of the present invention. The magnetic sheet pack 5 comprises an envelope 101 and a magnetic sheet 102 such as a thin disc of a flexible material, for example plastic materials, rotatably enclosed in the envelope 101. Upon loading the magnetic sheet pack 5, it is essential to insert the magnetic sheet pack 5 with its front surface upward and with the edge of the magnetic sheet pack 5 indicated by the arrow A in FIG. 2A corresponding to the side indicated by the arrow A in FIG. 1. The magnetic sheet 102 comprises a disc-shaped magnetic recording material 103 with a magnetic material layer provided on the rear surface thereof and a center core 104 with a polygonal center opening 105 in which a spindle 11 attached to the top of the driving motor shaft 10a is receivable. Provided near the center opening 105 in the center core 104 is an elongated opening 106 which permits the center core 104 to deform elastically so as to grip the spindle 11. This provision for elastic deformation contributes to the mounting of the magnetic sheet 102 on the spindle 11 with almost no play.

The envelope 101 includes openings 107, 108 in both walls thereof, permitting the passage of the center core 104 of the magnetic sheet 102. The envelope 101 also includes windows 109, 110 in both walls thereof, permitting the access of a control plate 25 to the front, or unrecordable, surface of the magnetic sheet and a magnetic head to the rear, or recordable, surface of the magnetic sheet, respectively. Shown by the double dotted chain line 111 is a shutter member which is slidably moved so as to open and close the windows 109, 110. This sliding movement results from the engagement of the shutter member with a lug provided in the pack holder 4, which engagement occurs upon the insertion of the magnetic sheet pack 5.

An indicator 112 for the number of recorded tracks cooperates with a well-known mechanical device for feeding a magnetic head step by step. As seen in FIG. 2B, there is provided in the rear side of the envelope 101 a record protection pawl 113 similar to the pawl of an audio cassette for the prevention of false erasing. The absence of the record protection pawl 113 prohibits any recording on the magnetic sheet so as to prevent overlapping recording. The presence of the record protection pawl 113, which may be detectable by a detector well known in the art and incorporated in the apparatus, allows the magnetic sheet to be recorded repeatedly.

The envelope 101 also has holes 114, 115 which receive positioning pins 9 (only one of which is shown in FIG. 1) on the body 1 of the apparatus and thereby ensure the correct positioning of the magnetic sheet pack 5 in the apparatus. The fixing of the magnetic sheet 102 to the spindle is a result of such correct positioning. Specifically, a metal hub 117 which is secured to the underside of the plastic center core 104 is attracted to and held by a permanent magnet Mg provided inside a recessed end of the spindle 11 when the magnetic sheet pack 5 is in place.

The magnetic head 12 which is provided inside the body 1 of the apparatus is able to touch the rear surface of the magnetic sheet 102 through the windows of the pack holder 4 and the envelope 101. On the other hand, the control plate 25 secured to a holder 28 which is elastically supported on the door 3 through the flat spring 26 is adapted to come into contact with the front surface of the magnetic sheet 102 through the windows of the pack holder 4 and the envelope 101. The reference numeral 13 indicates a well-known head drive mechanism for generating the radial movement of the magnetic head 12, which mechanism, as is well known, comprises a feed screw rotated by a pulse motor and a moving bed.

The pack loading part 2 has a structure such that the loading door 3 is capable of overriding movement in the closing direction and return movement to the locked position. Specifically, the loading door 3 as well as the flat springs 26, 27, the control plate holder 28 and the pack holder 4 with the magnetic sheet pack 5 enclosed therein move downwardly as seen in FIG. 1 and override the locked position against the reaction of the flat springs 26, 27. However, the holders 28, 4 are left and held in their predetermined positions in the body 1 of the apparatus. Upon overriding movement of the loading door 3, the holder 28 is pressed by the flat spring 26 secured to the loading door 3 and thereby held in its predetermined position so as to keep the control plate 25 in contact with the magnetic sheet 102. Simultaneously, the envelope 101 is pressed by the flat spring 27 against the body 1 of the apparatus while the positioning pins 8 enter the holes 114, 115 of the envelope 101, thereby positioning correctly the magnetic sheet pack 5 in the body 1 of the apparatus.

After the completion of the correct positioning of the magnetic sheet pack 5, the lugs 17 press the center core 104 of the magnetic sheet 102 to be loaded on the spindle 11 upon overriding movement of the loading door 3. Upon releasing the force exerted against the loading door 3, the loading door 3 is returned under the influence of the reaction force of the compressed flat springs 26, 27 to the locked position shown in FIG. 1 with the lugs 17 spaced from the center core 104. At this time, the loading door 3 is locked by the locking mechanisms 6 against further movement.

In FIG. 1, reference numeral 20 indicates a motor drive circuit which is enabled to operate by closing a switch so as to control the rotation of the motor 10 upon the receipt of signal from a control circuit.

Figure 3:
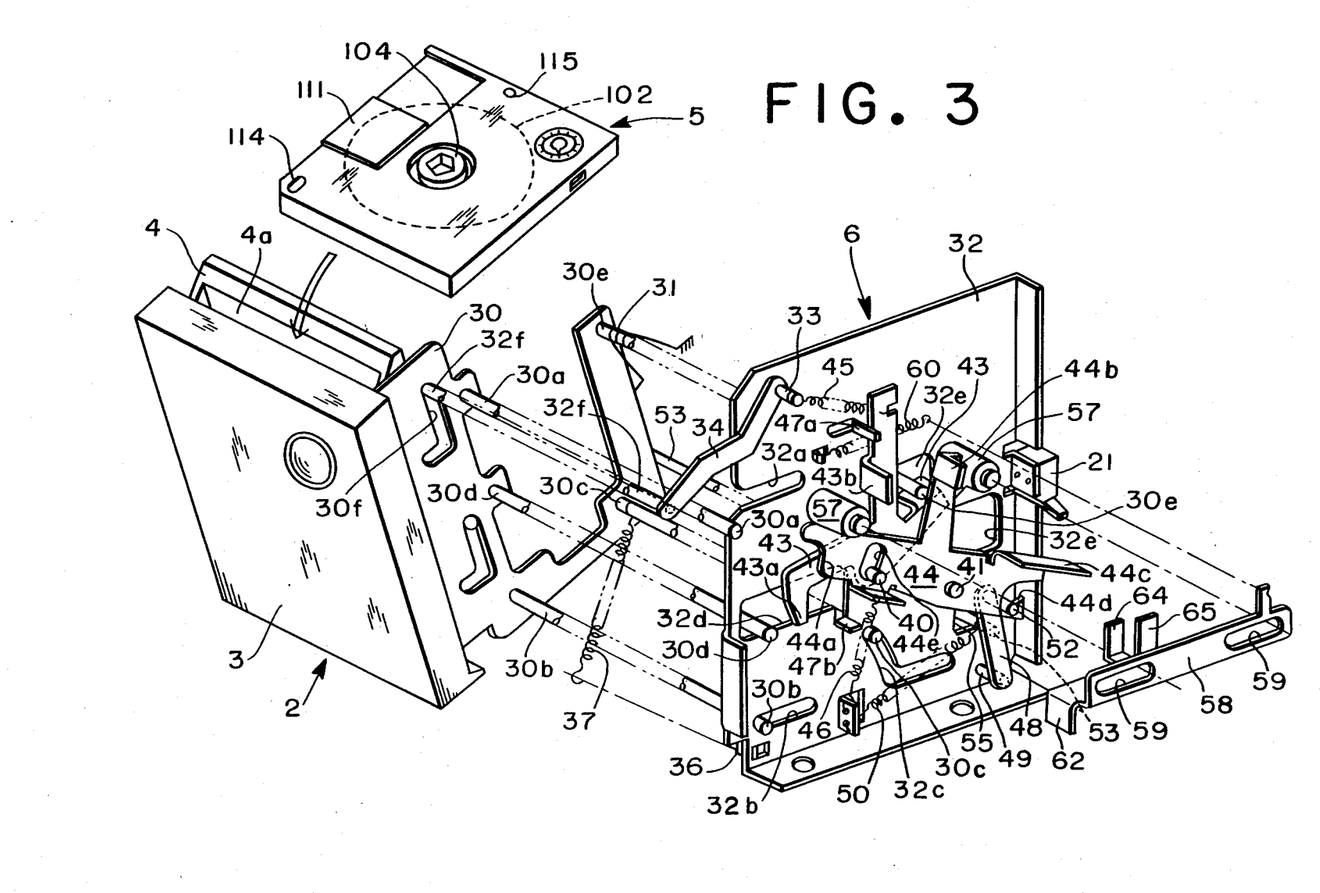
FIG. 3 is an exploded perspective view of a preferred embodiment of the present invention.
Figure 4:
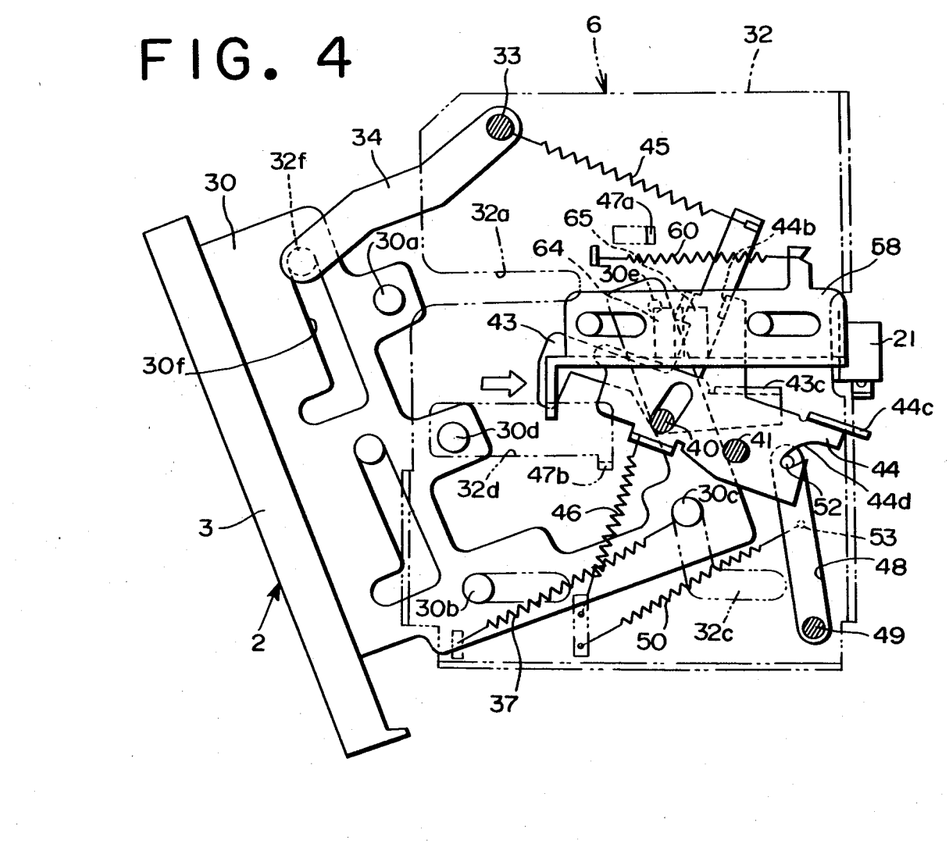
FIG. 4 is a side view showing the position of the parts after the loading door of FIG. 3 has been released by pushing an unlocking member.
Figure 5:
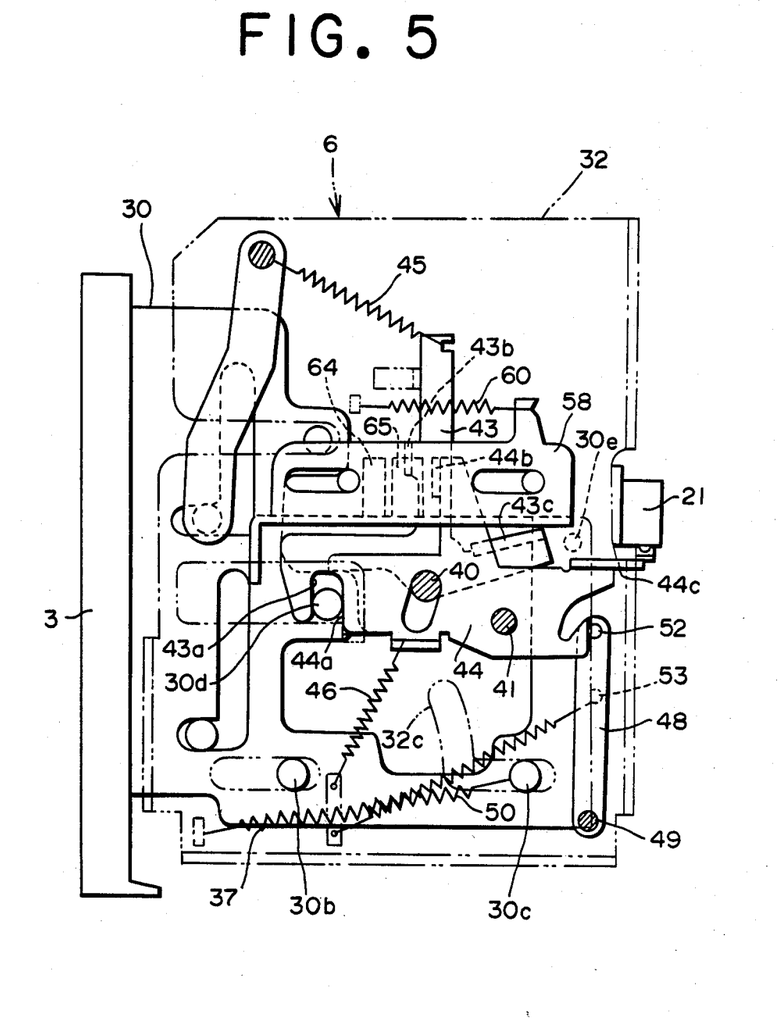
FIG. 5 is a side view showing the position of the parts in which the loading door of FIG. 3 is closed.

Referring now to FIGS. 3 through 5, there is shown therein an exemplary embodiment of the locking mechanism according to the present invention. The pack holder 4, which is elastically supported inside the loading door 3 by the flat springs 27 (not shown in FIGS.

Figure 6:
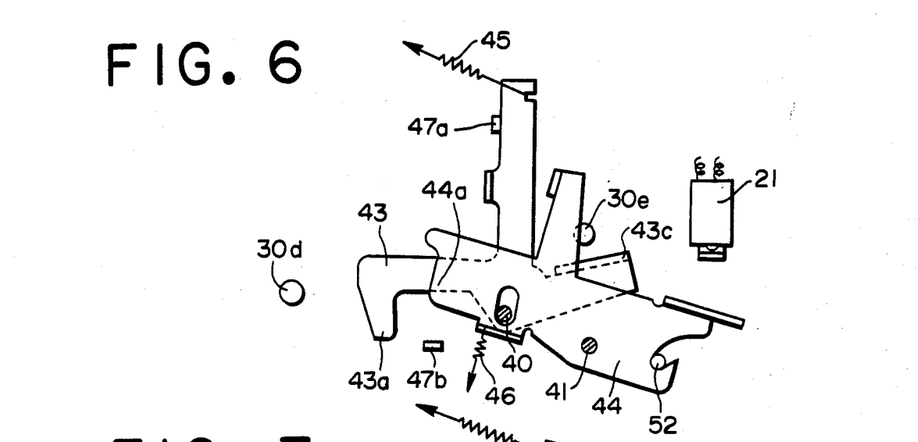
FIG. 6 is a side view showing the essential part of FIG. 3 when the loading door is being closed.
Figure 7:
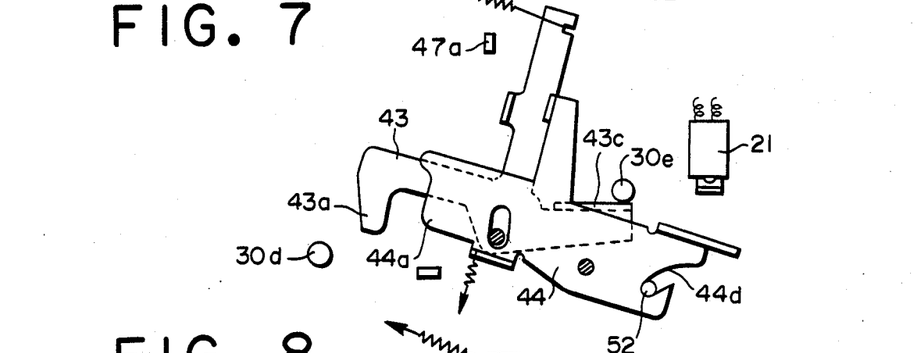
FIG. 7 is a side view showing the essential part of FIG. 3 when the loading door is very close to a locking position.

5–7) has an elongated opening 4a for allowing the insertion of the magnetic sheet pack 5 for loading it. The shutter 111 is open so as to provide access of the magnetic head 12 to the magnetic sheet 102. The loading door 3 is fixedly provided with a generally U-shaped control plate 30 with control pins 30a through 30c, a lock pin 30d and a push rod 30e, and having L-shaped guide slots 30f formed therein.

A side plate 32 fixed to the body 1 of the apparatus has guide slots 32a, 32b, 32c formed therein which are engaged by the control pins 30a, 30b, 30c on the control plate 30, respectively. The side plate 32 further includes openings 32d, 32e. A lever 34 which is pivotally mounted on a pivot on the side plate 32 has a pin 32f, which pin is engageable in the guide slot 30f of the control plate 30. Between the pin 30c of the control plate 30 and a lug 36 of the side plate 32, and the right end of the control plate 30 and the side plate, there are stretched a restoring spring 37 and a coiled torsion spring 31, respectively, so as to force the loading door 3 to be normally open.

As will be apparent from the above description, when the loading door 3 is opened, the loading door 3, at first, moves in parallel to itself in the left hand direction of FIG. 3 and then pivotally moves about the guide pin 30b in the counterclockwise direction until the guide pin 30c reaches the end of the guide slot 32c. This movement of the loading door 3 is made possible by the pin-slot relationship between the control plate and the side plate.

Pivotally mounted on pivots 40, 41 on the side plate 32 are first and second lock levers 43, 44 which are urged by springs 45, 46 to move counterclockwise. The first lock lever 43 has a hooked portion 43a and bent portions 43b, 43c. The second lock lever 44 has a latch portion 44a, bent portions 44b, 44c and an engagement groove 44d. Furthermore, the second lock lever 44 has an opening 44e for allowing the pivotal movement thereof about the pivot 41 without any interference with the pivot 40. The reference numerals 47a, 47b denote stop means for limiting the counterclockwise pivotal movement of the first and second lock levers 43, 44.

The hooked portions 43a, 44a of levers 43, 44, respectively, are located adjacent the opening 32d so as to be able to engage with the lock pin 30d passing therethrough. On the other hand, the bent portion 43c of the first lock lever 43 is located adjacent to an opening 32e so as to be acted on by the push rod 30e passing therethrough.

The side plate 32 is also provided with a latch lever 48 pivotally mounted on a pivot 49 and urged by a spring 50 to move in the counterclockwise direction. On the latch lever 48 there is provided a latch pin 52 in registry with the groove 44d of the second lock lever 44, and a control pin 53 which extends through an opening 55 of the side plate 32, in the path of movement of the control plate 30.

The side plate 32 has two further pins 57 each of which engages in a slot 59 of a release plate 58 so as slidably to support the release plate 58 through this pin-slot engagement. The release plate 58 which is urged by a return spring 60 to move to the left as seen in the drawings, has a downwardly bent portion 62 by which it is caused to move slidably to the right as seen in the drawings, by a release button operable from outside the apparatus. The release plate 58 also includes upwardly bent portions 64, 65, which are adapted to push the bent portions 43b and 44b, respectively, so as to swing the first and second lock levers 43, 44 in the clockwise direction against the respective return springs 45, 46 when the release plate is slidably moved in the righthand direction.

The switch 21 shown in FIG. 1, which is attached to the side plate 32, is closed by the bent portion 44c of the second lock lever 44 when the insertion of the magnetic sheet 102 is completed, as a result of the pivotal movement of the second lock lever 44 counterclockwise to the locking position.

Figure 8:
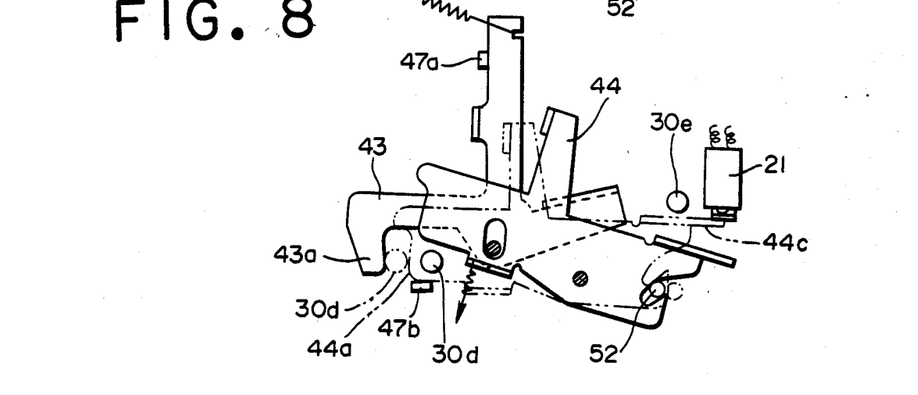
FIG. 8 is a side view showing the essential part of FIG. 3 when the loading door is locked after the loading door has moved beyond the locking position and then returned thereto.

The operation of the above embodiment will now be explained with reference to FIGS. 6 through 8, which show the motions of the first and second lock levers.

When the loading door 3 is in the fully opened position shown in FIG. 4, the exposed, elongated opening 4a permits the insertion of the magnetic sheet pack 5 into the pack holder 4. After the insertion of the magnetic sheet pack 5, the loading door 3 is pushed so as to move inward close to the body 1 of the apparatus, being at first rotated clockwise about the guide pin 30b through the pin-slot engagement 30c-32c. Simultaneously, the lock pin 30d and the push rod 30e move clockwise tracing circular arcs in the relatively wide openings 32d, 32e, respectively. Then the push rod 30e, as shown in FIG. 7, strikes the bent portion 43c of the first lock lever 43. As a result, the first lock lever 43 is caused to rotate clockwise against the force of the return spring 43 so as to bring the hooked portion 43a into the unlocked position spaced from the arcuate path of movement of the lock pin 30d.

The loading door 3 is thereafter moved parallel to itself through the pin-slot engagements 30a-32a, 30b-32b, 30c-32c. The parallel movement of the loading door 3 causes the push rod 30e to slide on the bent portion 43c of the first lock lever 43 and causes the lock pin 30d to move toward the locked position. As described above, when the loading door 3 is moved beyond the locking position, the push rod 30e leaves the end of the bent portion 43c so that the first lock lever 43 is permitted to rotate counterclockwise as shown by the solid line in FIG. 8. At the same time, the hooked portion 43a of the first lock lever 43 intercepts the retreat of the lock pin 30d which has been moved beyond its locked position, blocking the movement of the loading door 3 toward its open position.

As for the second lock lever 44, when the loading door 3 is moved beyond the locking position, the rightmost edge of the control plate 30 is brought into contact with the control pin 53 mounted on the stop lever 48, causing the pivotal movement of the stop lever 48 in the clockwise direction. This permits the stop pin 52 to escape from the groove 44d of the second lock lever 44, so that the second lock lever 44 is forced to rotate counterclockwise by the spring 46. Consequently, the lower edge adjacent to the hooked portion 44a of the second lever 44 strikes the lock pin 30d which has overridden its locked position. At this time, the loading door 3 has been moved as far as it will be moved.

After the completion of the movement of the loading door 3, the removal of force on the loading door 3 permits the loading door 3 to move back under the influence of its return spring 37. When the lock pin 30d moves back the distance by which the loading door 3 has overridden, the lock pin 30d is engaged by the hooked portion 43a of the first lock lever 43. Simultaneously, the escape of the lock pin 30d from the second lock lever 44 permits the second lock lever 44 to pivot farther in the counterclockwise direction so as to come into the path of the lock pin 30d and thereby prevent the overriding movement of the loading door for being repeated, as is shown by the double dotted chain line in FIGS. 5 and 6.

When the further pivotal movement of the second lock lever 44 occur, the bent portion 44c of the second lock lever 44 closes the switch 21 to supply electric power to the motor driving circuit 20. At this time, the correct mounting of the magnetic sheet 102 has been completed by the overriding movement of the loading door 3, and the flat spring 16 has been spaced away from the center core 104 of the magnetic sheet 102 by the return motion of the loading door 3. When the control circuit 24 provides a motor driving signal, the motor 10 starts to rotate so as to rotate the magnetic sheet at 3600 rpm for recording video signals on one field thereon or for reading out the video signals recorded on one field to reproduce a field image. In this embodiment, the magnetic head 12 is adapted to take one step every two revolutions of the magnetic sheet 102 so as to record video signals for one frame in two tracks.

In the above-described embodiment, although the first lock lever 43 is moved to its locking position upon overriding movement of the loading door 3 and the second lock lever 44 is moved to its locking position upon return movement of the loading door 3, the first lock lever 43 is not always required to be moved upon overriding movement of the loading door 3. What is essential is that the first and second lock levers 43, 44 move to their blocking positions by the time the loading door 3 returns to the locking position after the overriding movement thereof.

To open the loading door 3, it suffices to move the release plate 58 in the direction shown by the arrow in FIG. 4. More specifically, when the release plate 58 is slidably moved in the righthand direction as seen in FIG. 4, by the depression of the manually operable release button, the lug 65 of the release plate 58 pushes the bent portion 44b of the second lock lever 44 so as to cause the clockwise pivotal movement of the second lever. Simultaneously, the bent portion 44c of the second lock lever 44 makes the switch 21 turn off, so as to stop the motor 10, if it is rotating. When a predetermined pivotal movement of the second lock lever 44 has occurred, the second lock lever 44 does not move anymore because of the engagement of the groove 44d with the pin 52 mounted on the stop lever 48. Consequently, the second lock lever 44 is maintained in the state shown in FIG. 4, even though the force applied to the release plate is thereafter discontinued.

On the other hand, the slidable movement of the release plate 58 by depression of the release button causes the lug 64 of the release lever to push the bent portion 43b of the first lock lever 43 so as to, at first, cause the clockwise rotation of the first lock lever 43 to induce the lock portion 43a to escape from its locking position. As a result, the locked pin 30d is released to permit the guide pin 30c to be moved, at first in the horizontal part of the opening 32c and then in the slanting part thereof by the restoring coil spring 31, so that the loading door is completely opened by the restoring spring 37.

It should be noted that the first and second levers 43, 44 are timely released by the movement of the release plate 58. It is preferable to perform the operations in the following sequence. The second lock lever 44 is, in the first instance, released, following which the bent portion 44c makes the switch 21 turn off. The first lock lever 43 is actuated to release the lock pin 30d from the locking portion 43a just after having forced the motor to stop completely. Because the first lock lever 43 is enabled to be actuated after a certain interval which, notwithstanding the dependence on inertia of the motor, is sufficient if it is several milliseconds, the withdrawal of the magnetic sheet pack 5 is immediate after the motor 10 has stopped completely. The time interval is mechanically provided in such a way that the time when the bent portion 43b of the first lock lever 43 comes into contact with the lug 64 of the release plate 58 is determined relative to the time of the contact of the bent portion 44b of the second lock lever 44 with the lug 65 of the release plate 58.

As will be apparent from the above description, upon discontinuing the force applied to the release plate 58 after the release of the second and first lock levers 44, 43 sequentially in the order described herein, the first lock lever 43 will be returned by its restoring spring 45 to the position shown in FIGS. 3 and 6 and the release plate 58 will be returned to its initial position by the force of its restoring spring 60. It will be understood from the above that the first and second lock levers 43, 44 can, when they are adapted to rotate in the same direction for unlocking, be released by the action of only the single release plate.

Figure 9:
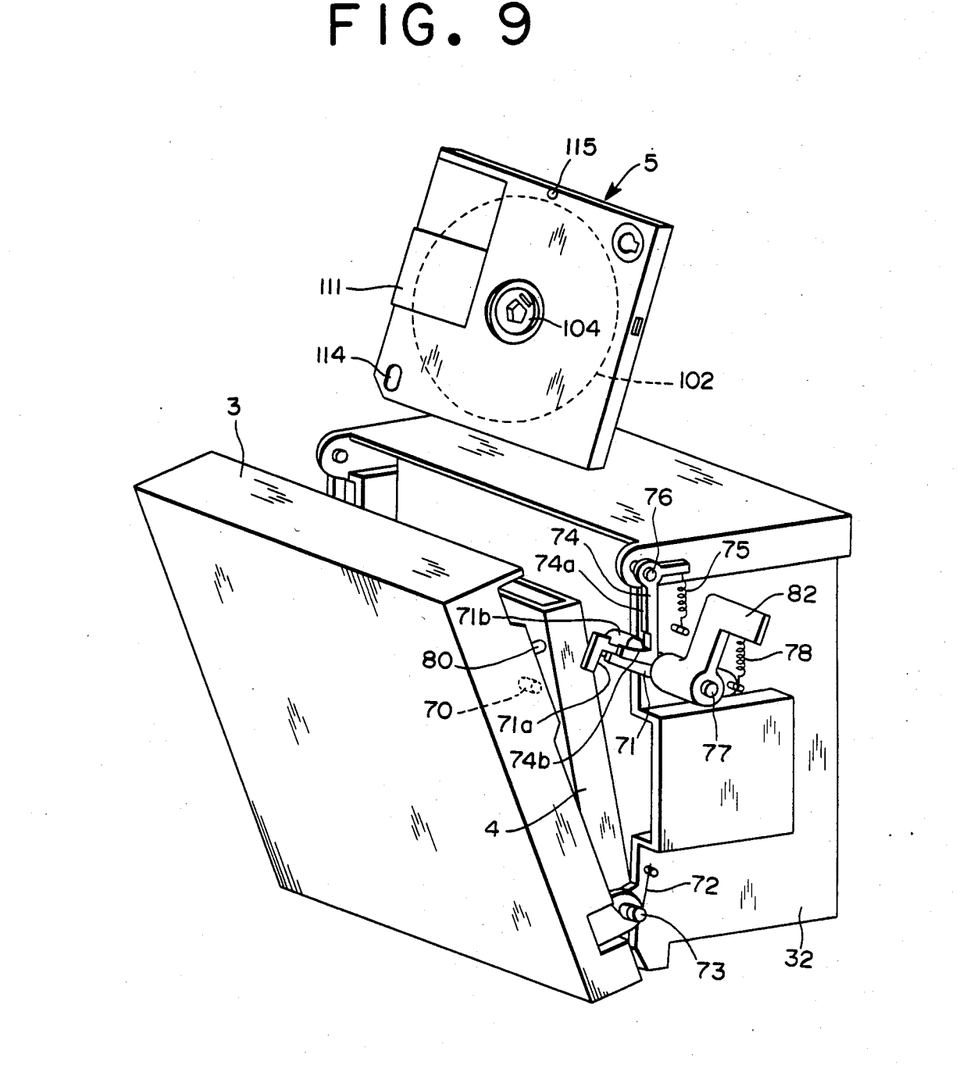
FIG. 9 is a perspective view of another preferred embodiment of the present invention.
Figure 10:
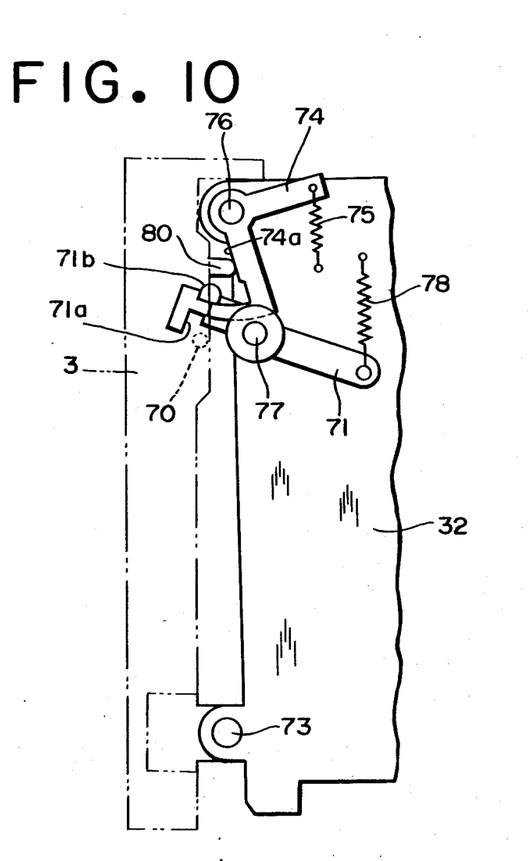
FIGS. 10 and 11 are explanatory fragmentary views of the embodiment shown in FIG. 9.

Turning now to FIG. 9, there is shown therein another preferred embodiment of the present invention in which the loading door 3 is pivotally mounted on the side plate 32 so as to pivotally override its locking position and then return to be locked in that position. The loading door 3 is locked by the engagement of lock pin 70 provided with a single lock lever 71 inside the loading door 3. The apparatus in the state shown in FIG. 9 permits the insertion of the magnetic sheet pack 5 into the pack holder 4. Upon the insertion of the magnetic sheet pack 5, the shutter 111 which is slidably mounted on the outside of the magnetic sheet pack 5 is opened permitting the access of the control plate 25 and the magnetic head 12 to the magnetic sheet 102. After the insertion of the magnetic sheet pack 5, the loading door 3 is pivotally moved clockwise against the force of a restoring spring 72 together with the pack holder 4. The loading door 3 is then pivotally moved farther, to override the locking position, as shown in FIG. 10, along with the pack holder 4.

In the same manner as described in connection with the first embodiment shown in FIG. 1, the overriding loading door 3 forcibly pushes the center core 104 onto the spindle 11. At the same time, a push pin 80 on the loading door 3 pushes a hold lever 74 so as to swing counterclockwise about a pivot pin 76 against the force of a restoring spring 75. The pivotal movement of the hold lever 74 to its limit causes the latch portion 74b to disengage the pin 71b of the lock lever 71, permitting the lock lever 71 to swing counterclockwise about a pivot 77 against the force of a restoring spring 78. The lock lever 71 is, however, stopped by engagement with a lock pin 70.

Figure 11:
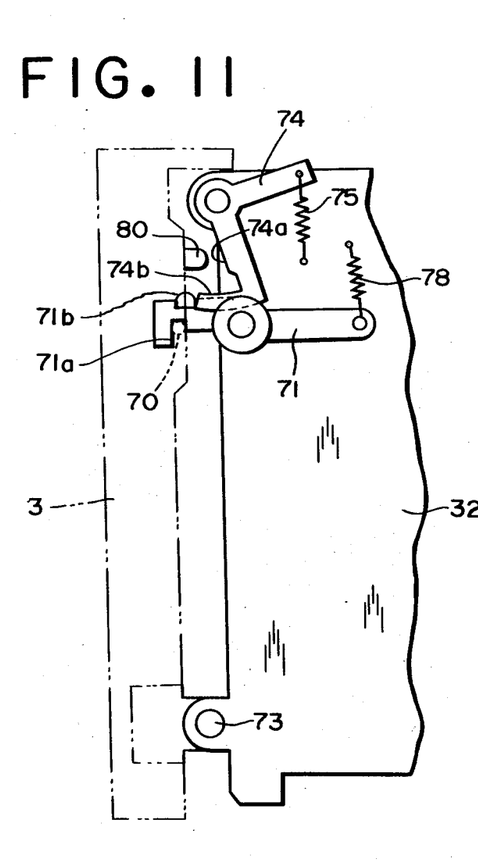

Upon discontinuing the force applied to the loading door 3, the loading door 3 is pivotally moved counterclockwise by the force of the restoring spring 72. In the course of the pivotal return movement of the locking door 3, the lock pin 70 is permitted to fall into a notched portion 71a of the lock lever 71 so as to prevent any further pivotal movement of the loading door 3. At the same time, the hold lever 74 is retained in the position shown in FIG. 11 inspite of the disengagement with the push pin 80 because the pin 71b of the lock lever 71 has moved into the path of the hold lever 74.

For withdrawing the magnetic sheet pack 5 from the apparatus after recording or reproducing, it suffices to manipulate an eject handle 82 which is integrated with the lock lever 71. Upon manipulating the eject handle 82, the lock lever 71 pivotally moves clockwise to release the lock pin 70, permitting the pivotal opening movement of the loading door 3 which is followed by the pack holder 4. On the other hand, the clockwise movement of the lock lever 71 caused by the manipulation of the eject handle 82 permits the hold lever 74 to swing clockwise by the force of the restoring spring 75, thereby positioning the latch portion 74b below the pin 71b of the lock lever 71 and thereby holding the lock lever 71 in the position shown in FIG. 9. Because the opening of the loading door 3 brings the pack holder 4 into its opened position, the center core 104 is detached from the spring 11 to permit the withdrawal of the magnetic sheet pack 5.

Figure 12:
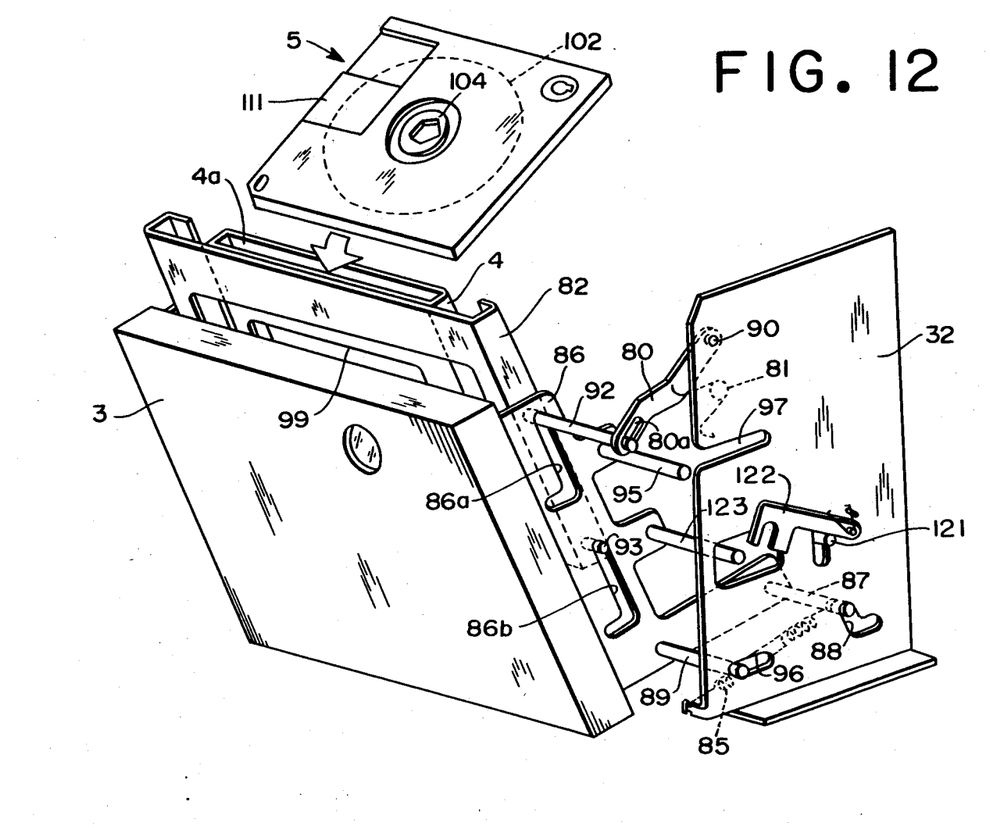
FIG. 12 is an exploded perspective view of still another preferred embodiment of the present invention.

Referring to FIG. 12, there is shown therein still another embodiment according to the present invention in which a pack holder is adapted to move up and down upon opening and closing movement of the loading door 3 in order to ensure the prevention of misloading of the magnetic sheet pack. It should be noted that the loading door 3 is moved parallel to itself during its overriding movement in order to ensure the correct location of the control plate in the same manner as described in connection with the first embodiment of the present invention.

As shown in FIG. 12, when the loading door 3 is fully opened for loading or unloading the magnetic sheet pack 5 from the apparatus, the pack holder 4 partially protrudes from the loading door 3 for easy insertion of the magnetic sheet pack 5 thereinto. There is provided a coiled torsion spring 81 supported between the side plate 32 and a lever 80, which exerts force on the lever 80 to cause the clockwise swinging movement of the lever 80 for raising a base plate 82 and the pack holder 4 along the inside of the loading door 3. When the loading door 3 is opened for loading and unloading the magnetic sheet pack 5, the loading door 3 is spaced from the base plate 82 so that the control plate 25, the pack pressure spring 27, the pressure lugs 17 and other parts are moved away from the pack holder 4 to permit the insertion of the magnetic sheet pack 5 thereinto.

When exerting force on the loading door 3 so as to effect the closing movement thereof, the loading door 3 is caused to swing clockwise about a pivot 89 mounted on the control plate 86 because of the slidable enagement of a guide pin 87 of the control plate 86 with the arcuate portion of a guide slot 88 formed in the side plate 32. Meanwhile, the lever 80 is swung counterclockwise about a pivot 90, causing a guide in 92 slidably engaged in a slot 80a formed in the lever 80 to move down in a guide slot 86a formed in the control plate 86.

The guide slots 86a, 86b formed in the control plate which are slidably engaged by the guide pins 92, 93, respectively, permit the downward movement of the base plate 82 and pack holder 4 along the inside of the loading door 3 upon closing movement of the loading door 3. When the pin 87 engages the lower end of the guide slot 88, the loading door 3 is stopped. At the same time, the base plate 82 and the pack holder 4 are completely covered by the loading door 3. By continuing to push the loading door 3 in the closing direction, the loading door 3 is then moved parallel to itself to the right because guide pins 87, 89, 95 are permitted to move within horizontally extending guide slots 88, 96, 97, respectively. At the beginning of the parallel movement of the loading door 3, the base plate 82 and the pack holder 4 also move parallel to themselves together with the loading door 3. After a certain such parallel movement thereof, the magnetic sheet pack 5 will be blocked by the positioning pins 9 as shown in FIG. 1 and thereby properly positioned as well as the pack holder 4 by the body 1 of the apparatus. When the loading door 3 is caused to move farther, the loading door 3 approaches the pack holder 4 and elastically deforms the pack pressure spring 27. Simultaneously, the control plate 25 (shown in FIG. 1) approaches the magnetic sheet 102 through the opening 99 formed in the pack holder 4. The loading door 3 is finally stopped when the positioning pins 101 of the body 1 enter the holes 100 formed in the holder 28 for the control plate 86 and thereby completed the correct positioning of the holder 28.

Figure 13:
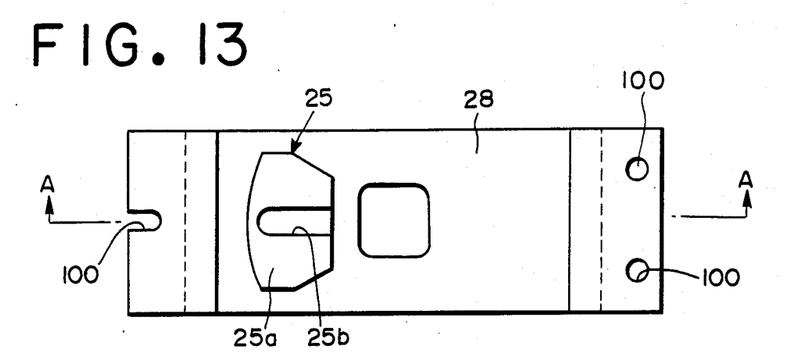
FIG. 13 is a bottom view of a control plate and a control plate holder.
Figure 14:
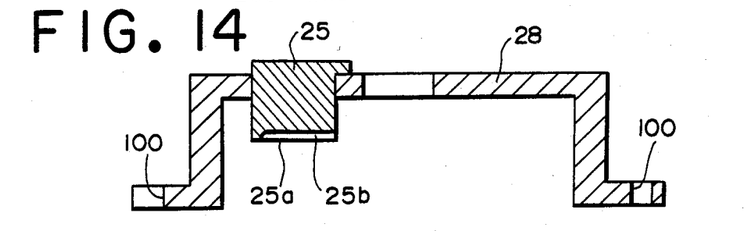
FIG. 14 is a cross sectional view taken along the line A—A in FIG. 13.
Figure 15:
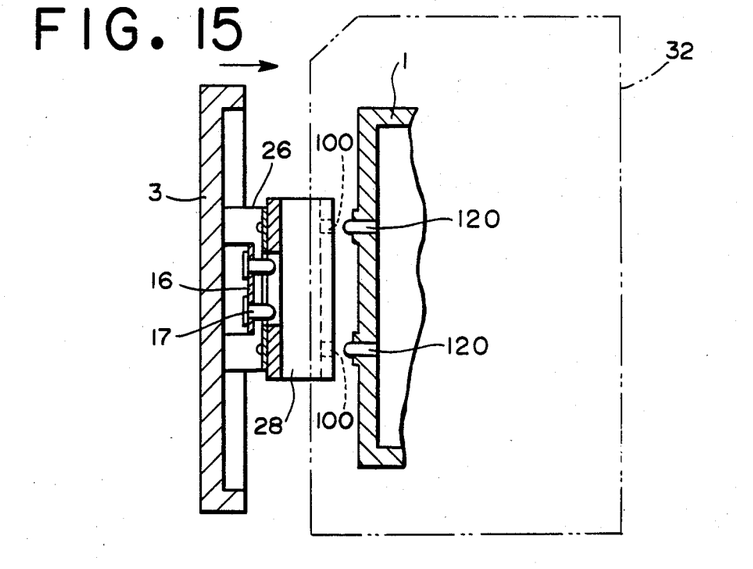
FIG. 15 is a cross sectional view showing the door of FIG. 12 just before the overriding movement of the loading door.

The control plate 25 and its holder 28 shown in detail in FIGS. 13 and 14 are so structured that, when the holder 28 is held in its correct position, the under surface 25a of the control plate 25 is located close to the base side of the magnetic sheet 102 in such a way that an elongated groove 25b formed in the under surface 25a of the control plate 25 is located opposite the magnetic head 12 (shown in FIG. 1) and coincides with the direction in which the magnetic head 12 is moved step by step in a conventional manner. As is shown in FIG. 15, the movement of the control plate 25 and its holder 28 is produced as a result of the parallel movement of the loading door 3 described above. Therefore, the holes 100 are positioned to lie on the same axes as the positioning pins 120, so as to permit the positioning pins 120 to fit the holes 100. This reduces the wear between them and ensures the correct positioning of the control plate 25.

Figure 16:
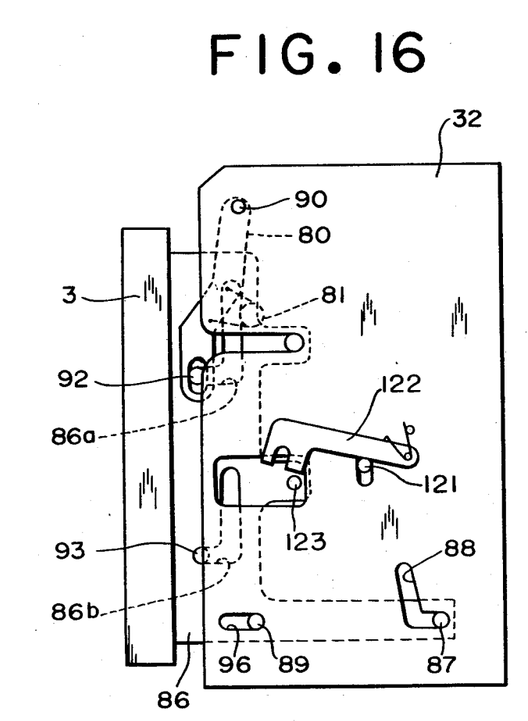
FIGS. 16 and 17 are side views showing the loading door of FIG. 12 after overriding movement and locked, respectively.
Figure 17:
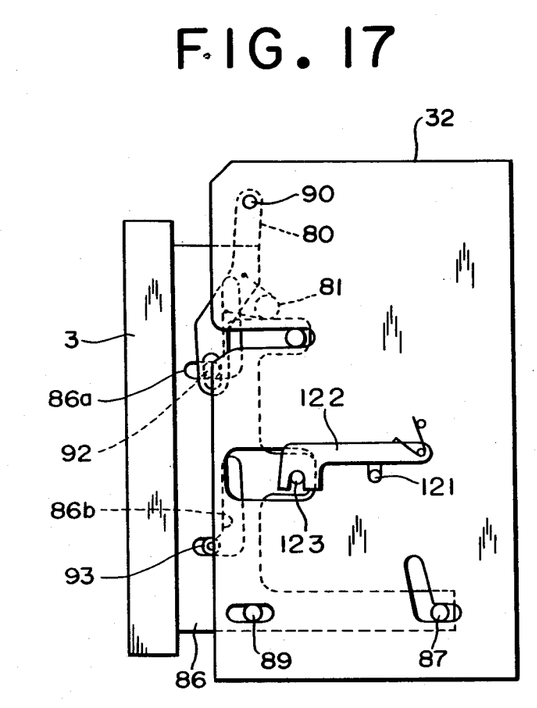

When the loading door 3 is moved farther, the loading door 3 approaches the pack holder 4 and the control plate holder 28 until the guide pins 92, 93 come into contact with the ends of the guide slots 86a, 86b as shown in FIG. 16. Meanwhile, the pressure pins 17 elastically supported inside the loading door 3 press on the center core 104 to attach it to the spindle 11.

When the loading door 3 is fully moved in such a manner as described above, the latch pin 121 releases the lock lever 122 held in its unlocked position by means of, for example, the mechanical device described in the second embodiment. As a result, the lock lever 122 swings counterclockwise so as to engage against the lock pin 123 mounted on the control plate 86. Upon discontinuing the force applied to the loading door 3, the loading door 3 moves back by the force of the restoring spring 85. During the opening movement, the forked portion of the lock lever 122 engages the lock pin 123 so as to lock the loading door 3 in its locked position and thereby to inhibit the movement thereof in any direction.

A manually operable eject button (not shown) is provided in the apparatus in order to effect easy withdrawing. The eject button is manually depressed to move the latch pin 121 upward, pivotally moving the lock lever 122 clockwise so as to disengage the lock pin 123 from the forked portion of the lock lever 121. The loading door 3 is then forcibly moved parallel to itself by the force of the restoring spring 85, to an open position. After the pin 89 has come into contact with the forward end of the slot 96, the loading door 3 is swung counterclockwise about the pin 89 to its fully opened position shown in FIG. 12. Upon pivotal opening movement of the loading door 3, the lever 80 is swung clockwise so as to move the pack holder 4 and the base plate 82 upwardly.

As will be understood from the above description, because the pack holder 4 partially protrudes from the loading door 3 when the loading door is fully opened for loading a magnetic sheet pack, the insertion of a magnetic sheet pack into the pack holder is performed more easily and without mishap.

It will be appreciated that various modifications and changes of the preferred embodiments, some of which have been described above, may be made without departing from the scope of this invention as defined in the accompanying claims.

What is claimed is:

1. A magnetic recording/reproducing apparatus having a door capable of opening and closing for loading and unloading a pack that contains a magnetic sheet with a center core, the door when closed having a locked position, means mounting said door for overriding movement beyond said locked position and for return movement thereafter back to said locked position, a pressure member inside said door for pressing said center core of said magnetic sheet on a driving spindle of said apparatus upon said overriding movement of said door; and mechanical means for locking said door in said locked position, said mechanical lock means being adapted to be actuated by said return movement of said door so as to lock said door in a position in which said pressure member is spaced from said center core.

2. A magnetic recording/reproducing apparatus as defined in claim 1, and switching means for controlling a spindle driving motor in cooperation with the locking action of said mechanical lock means.

3. A magnetic recording/reproducing apparatus as defined in claim 1, wherein said mechanical lock means comprises a first lock member for inhibiting the opening movement of said door and a second lock member for inhibiting the closing movement of said door.

4. A magnetic recording/reproducing apparatus as defined in claim 1, wherein said mechanical lock means further comprises a lock pin mounted on said door and a lock lever having a forked portion engageable with said lock pin to lock the door.

5. A magnetic recording/reproducing apparatus as defined in claim 4, further comprising control means which is adapted to be positioned so as to be close to said magnetic sheet when said door is locked in its locked position, and movable guide means for causing said door to move parallel to itself during said overriding movement.

6. A magnetic recording/reproducing apparatus as defined in claim 1, further comprising a pack holder slidably mounted in said door for receiving a magnetic sheet pack therein, and means for slidingly moving said pack holder in cooperation with opening and closing movement of said door, said means being adapted to move said pack holder upwardly partially protruding out of said door in cooperation with said opening movement of said door and downwardly being fully covered with said door before said overriding closing movement of said door.

* * * * *